L. MARK AND P. BIALY.
SPRING WHEEL.
APPLICATION FILED MAR. 23, 1921.
1,407,669.
Patented Feb. 21, 1922.
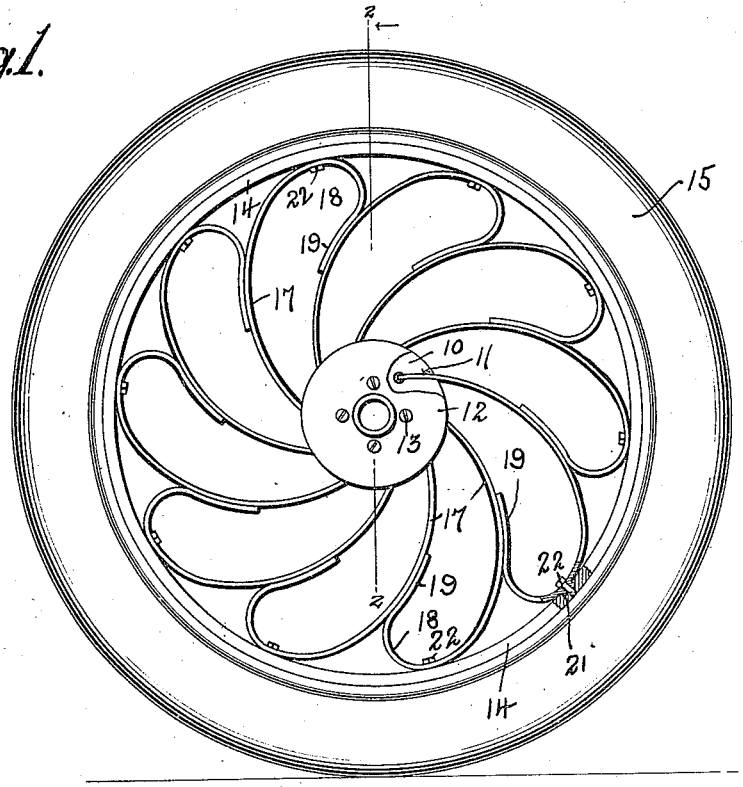
Fig. 1.
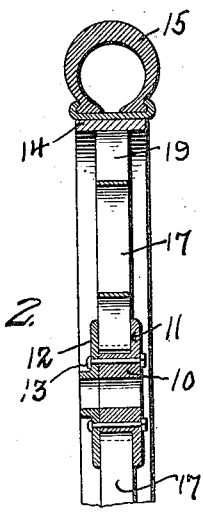
Fig. 2.
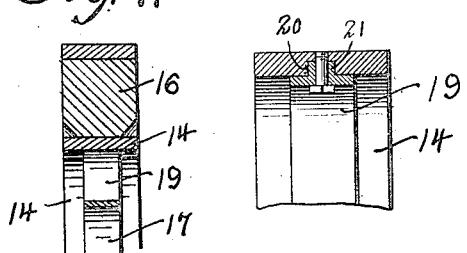
Fig. 4.
Fig. 3.
Inventor
L. Mark,
P. Bialy,
By
Geo. P. Kimmel
Attorney

UNITED STATES PATENT OFFICE.

LOUIS MARK AND PETE BIALY, OF PORTLAND, OREGON.

SPRING WHEEL.

1,407,669.

Specification of Letters Patent. Patented Feb. 21, 1922.

Application filed March 23, 1921. Serial No. 454,963.

*To all whom it may concern:*

Be it known that we, LOUIS MARK and PETE BIALY, citizens of the United States, residing at Portland, in the county of Multnomah, in the State of Oregon, have invented certain new and useful Improvements in Spring Wheels, of which the following is a specification.

This invention relates to vehicle wheels of the resilient class, and has for one of its objects to provide a wheel having curved resilient spokes so arranged that they mutually support and reinforce each other.

Another object of the invention is to provide a device of this character including a rim and a hub of separable parts and a plurality of spring spokes attached to the rim and to the hub and detachably held, so that any individual spoke may be detached or applied as required.

With these and other objects in view the invention consists of certain novel features of construction as hereinafter shown and described, and then specifically pointed out in the claims, and in the drawings illustrative of the preferred embodiment of the invention:

Figure 1 is a side elevation, partly in section, of the improved wheel.

Fig. 2 is a section on the line 2—2 of Figure 1.

Fig. 3 is an enlarged section detail illustrating the manner of coupling the spokes to the rim.

Fig. 4 is a sectional detail illustrating a modification in the construction.

The improved wheel includes a rim, a hub of novel construction and a plurality of spring spokes of novel construction, so arranged and united that any individual spoke can be detached or replaced without disturbing the other parts.

The hub of the improved wheel comprises a body portion 10 adapted to engage the axle journal, not shown, and provided with a plurality of curved seats 11 opening through the periphery of the body and likewise at one side, and a bearing plate 12 attached to the body 10 by clamp bolts 13.

The rim of the improved wheel is represented as a whole at 14, while the tire may be of the pneumatic form as shown at 15 in Figs. 1 and 2, or the improved spokes may be applied to the ordinary felloe 16 of an ordinary wheel, as shown in Fig. 4.

The spokes of the improved wheel are each formed of a section of resilient material, preferably of steel, and each comprises a curved body portion 17 engaging by their inner ends respectively in the sockets 11 as illustrated in Figure 2, and with their outer portions curved inwardly toward the hub as shown at 18 with the curved portions bearing against the inner face of the rim and the terminals 19 reversely curved to conform to and bear against the adjacent face of the next body portion 17.

At the point where the curved portion 18 engages the rim 14 the rim is provided with a socket indicated at 20 in Fig. 3, and each curved portion 18 provided with an integral lug or projection 21 engaging in the socket. The spokes are secured to the rim by fastening devices such as bolts 22 passing through the curved portions 18 and the lugs 21 and tapped into the rim 14 as shown in Fig. 3.

By this means the spokes are firmly coupled to the rim, the bolts holding the spokes from inward displacement, and the lugs holding them from lateral displacement and likewise preventing shearing strains on the bolts.

The spoke members are initially so curved that considerable force will be required to dispose the spokes in position, thus insuring the requisite reactionary force to hold them in place, and likewise to provide the necessary resiliency to the wheel.

The curvature of the portion 18 of the spokes may be increased or decreased to correspondingly increase or decrease the resistance or stiffness of the spokes, to correspond to the vehicle and the load which it is constructed to carry.

This is an important feature of the improved device and materially increases the efficiency and utility of the device.

The device is simple in construction and can be inexpensively manufactured and applied without material structural change to wheels of various forms and sizes.

The preferred embodiment of the invention is disclosed in the drawings and set forth in the specification, but it will be understood that any modifications within the scope of the claims may be made in the construction without departing from the principle of the invention or sacrificing any of its advantages.

Having thus described the invention what is claimed as new is:—

A vehicle wheel including a rim and hub, resilient spokes attached at their inner ends to the hub and bent intermediate the ends and directed toward the hub and attached at the bent portion to the rim, the terminals of the bent portion being unattached and frictionally engaging the body portion of the next spoke in advance and reinforcing the same.

In testimony whereof, we affix our signatures hereto.

LOUIS MARK.
P. BIALY.